(12) United States Patent
Musahl et al.

(10) Patent No.: US 7,282,250 B2
(45) Date of Patent: Oct. 16, 2007

(54) METHOD FOR PROVIDING LONGITUDINALLY EXTENDED ARTICLES, SUCH AS CABLE ASSEMBLIES, WITH A SHEATHING

(75) Inventors: Esther Musahl, Offenburg (DE); Matthias Von Samson-Himmelstjerna, Henstedt-Ulzburg (DE); Klaus Külper, Pinneberg (DE)

(73) Assignee: Tesa AG, Hamburg (DE)

(*) Notice: Subject to any disclaimer, the term of this patent is extended or adjusted under 35 U.S.C. 154(b) by 383 days.

(21) Appl. No.: 10/333,709

(22) PCT Filed: Jul. 27, 2001

(86) PCT No.: PCT/EP01/08735

§ 371 (c)(1),
(2), (4) Date: Jul. 2, 2003

(87) PCT Pub. No.: WO02/11155

PCT Pub. Date: Feb. 7, 2002

(65) Prior Publication Data

US 2005/0115664 A1    Jun. 2, 2005

(30) Foreign Application Priority Data

Jul. 28, 2000  (DE) .......................... 100 36 805

(51) Int. Cl.
 *E09J 7/04*  (2006.01)

(52) U.S. Cl. ............... 428/43; 428/190; 174/105 R; 174/121 A; 156/53; 156/191; 156/192

(58) Field of Classification Search ............... 174/103, 174/105 R, 120 R, 121 R, 121 A, 122 R, 174/122 C, 124 R, 124 GC, 110 P; 428/41.7, 428/41.8, 43, 190, 191, 688; 206/701, 702, 206/719; 156/53, 56, 52, 190, 191, 192, 156/187, 252, 157, 505, 506
See application file for complete search history.

(56) References Cited

U.S. PATENT DOCUMENTS

| | | | | |
|---|---|---|---|---|
| 1,726,744 A | * | 9/1929 | Krug | 428/196 |
| 1,743,085 A | * | 1/1930 | Parsons et al. | 229/4.5 |
| 1,954,805 A | * | 4/1934 | Drew | 427/208.8 |
| 2,387,593 A | * | 10/1945 | Lesser | 428/190 |
| 4,359,357 A | * | 11/1982 | Friese | 156/201 |
| 4,622,260 A |   | 11/1986 | Tesch | |

(Continued)

FOREIGN PATENT DOCUMENTS

DE         1 926 839         5/1969

(Continued)

OTHER PUBLICATIONS

International Search Report for PCT/FR01/01678, 2001.

*Primary Examiner*—Linda Gray
(74) *Attorney, Agent, or Firm*—Christa Hildebrand; Norris McLaughlin & Marcus, PA (57) ABSTRACT

The invention relates to a wrap assembly for wrapping longitudinally extended articles, such as cable assemblies. The wrapping uses a textile sheath and self-adhering adhesive tape. The sheath provides edged on each narrow side. The self-adhesive tape is narrow compared to the width of the covering. The adhesive tape is adhered to the sheath in such a manner that the adhesive tape extends over one of the longitudinal edges of the sheath.

2 Claims, 7 Drawing Sheets

U.S. PATENT DOCUMENTS

| | | | |
|---|---|---|---|
| 4,639,545 A * | 1/1987 | Pithouse et al. ............... 174/36 |
| 5,180,885 A | 1/1993 | Shah |
| 5,211,784 A * | 5/1993 | Haibach et al. ............... 156/71 |
| 5,278,356 A | 1/1994 | Miller |
| 5,356,007 A * | 10/1994 | Feldt .......................... 206/443 |
| 5,629,078 A | 5/1997 | Ganschow |
| 5,640,827 A * | 6/1997 | Van Someren et al. ....... 52/750 |
| 6,043,334 A * | 3/2000 | Kanamaru et al. ....... 430/58.35 |
| 6,368,440 B1 * | 4/2002 | Yu et al. ..................... 156/137 |
| 6,402,727 B1 * | 6/2002 | Rosengrant ............ 604/385.02 |
| 6,436,528 B1 | 8/2002 | Külper |
| 6,451,146 B1 | 9/2002 | Ganschow |
| 2002/0040213 A1 * | 4/2002 | Tweddell, III et al. .. 604/385.01 |
| 2002/0053392 A1 | 5/2002 | Lodde |

FOREIGN PATENT DOCUMENTS

| | | |
|---|---|---|
| DE | 2 020 585 | 4/1970 |
| DE | 42 19 509 | 12/1993 |
| DE | G 94 01 037.4 | 4/1994 |
| DE | 295 10 907 A | 10/1995 |
| DE | 44 42 092 C2 | 5/1996 |
| DE | 44 42 093 A1 | 5/1996 |
| DE | 44 42 507 C2 | 6/1996 |
| DE | 195 23 494 A1 | 1/1997 |
| DE | 196 11 586 A | 2/1997 |
| DE | 298 04 431 U1 | 9/1998 |
| DE | 197 32 958 A1 | 2/1999 |
| DE | 298 19 014 U1 | 4/1999 |
| DE | 199 23 399 A1 | 4/2000 |
| DE | 199 37 446 A1 | 4/2000 |
| EP | 0 071 212 B1 | 4/1986 |
| EP | 0 571 909 | 12/1993 |
| EP | 0 676 301 | 10/1995 |
| EP | 0 802 543 A1 | 10/1997 |
| EP | 0 914 986 | 5/1999 |
| GB | 2 089 228 | 6/1982 |
| GB | 2 304 228 A | 3/1997 |
| WO | 93 09941 | 6/1993 |
| WO | WO 94/16950 * | 8/1994 |
| WO | 97 00169 | 1/1997 |
| WO | WO 99/24518 | 5/1997 |

* cited by examiner

METHOD FOR PROVIDING LONGITUDINALLY EXTENDED ARTICLES, SUCH AS CABLE ASSEMBLIES, WITH A SHEATHING

BACKGROUND OF THE INVENTION

1. Field of the Invention

The invention relates to a method of wrapping elongate product, such as especially cable harnesses, with a textile sheath.

2. Description of the Related Art

The use of adhesive tapes with a nonwoven web backing for bandaging cable harnesses is known. For instance, DE-U 94 01 037 describes an adhesive tape having a tapelike textile backing comprising a stitchbonded web formed in turn from a large number of stitches which have been sewn in and which run parallel to one another. On the basis of its special design, the adhesive tape described exhibits soundproofing properties in the course of its use for cable harness bandaging.

Besides the stitchbonded nonwoven mentioned in the cited text there are further backings used in adhesive tapes for cable harness bandaging.

DE 44 42 092 describes such an adhesive tape, based on stitchbonded webs, which is coated on the reverse of the backing. DE 44 42 093 is based on the use of a web as backing for an adhesive tape, said web being a cross-laid fiber web which is reinforced by the formation of loops from the fibers of the web, i.e., a web known to the person skilled in the art by the name Malifleece. DE 44 42 507 discloses an adhesive tape for cable bandaging, but bases it on what are known as Kunit or Multiknit webs.

DE 195 23 494 C1 discloses the use of an adhesive tape having a backing comprising web material for bandaging cable harnesses, said tape being coated on one side with an adhesive. The web employed in accordance with the invention is a polypropylene spunbonded web which is thermally consolidated and embossed with the aid of a calender, the embossing roll having an embossing area of from 10% to 30%, preferably 19%.

DE 298 04 431 U1 likewise discloses the use of an adhesive tape having a backing comprising web material for the bandaging of cable harnesses, the proposed spunbonded web being of polyester.

DE 298 19 014 U1 discloses adhesive tapes based on a web which is consolidated with jets of air and/or water.

DE 199 23 399 discloses an adhesive tape having a tapelike backing of nonwoven web material, which is coated on at least one side with an adhesive, the web being a staple fiber web which is consolidated mechanically or is wet-laid. Between 2% and 50% of the fibers of the web are fusible fibers, specifically homopolymer, copolymer or bicomponent fibers having a relatively low softening or melting point.

It is mentioned by way of example that the fusible fibers of the web are of polypropylene, polyethylene, polyamide, polyester or copolymers.

Another adhesive tape having a tapelike backing of web material is disclosed in DE 199 37 446. The adhesive tape is coated on at least one side with an adhesive, the web being a staple fiber web which is consolidated mechanically or is wet-laid. Here, the further consolidation of the staple fiber web is accomplished by addition of binders, such as powders, films, meshes or binding fibers, for example. The binders may have been dissolved in water or organic solvents and/or may be present in dispersion form.

The binders are preferably employed as binder dispersions such as elastomers or such as thermosets in the form of phenolic or melamine resin dispersions, as dispersions of natural or synthetic rubbers, or as dispersions of thermoplastics such as acrylates, vinyl acetates, polyurethanes, styrene-butadiene systems, PVC, and copolymers thereof.

WO 99/24518 A1 describes an adhesive tape where the backing material is a web which acquires its suitability for adhesive tape use only through the specific selection of fibers or filaments having a linear density of more than 15 denier and also through a film layer which is extruded on additionally.

DE 197 32 958 A1 discloses an adhesive tape for wrapping elongate product, such as cable harnesses or plastic sections, which has a tapelike backing bounded by two lateral edges and provided on at least one side with a self-adhesive layer of a pressure-sensitive adhesive (PSA). The chemical composition of the PSA is such that, under gentle applied pressure on two adhesive layers lying one above the other, the interfaces are dissolved and the adhesive films coalesce completely to form a homogeneous PSA mass.

The invention depicted here also embraces a method of wrapping the elongate product. According to that method, the elongate product is positioned lengthways, in the region of a section of the adhesive tape, on a side of a tapelike backing of the adhesive tape that is provided with a self-adhesive layer, and then the adhesive tape is bonded in such a way that at least two adhesive regions of the tapelike backing are stuck to one another on the side provided with the adhesive layer in such a way that interfaces of the adhesive layer dissolve to form a homogeneous mass.

The result is therefore a pennant which protrudes from the wrapped product and which, especially under the restricted space conditions in automobile construction, is highly undesirable and harbors the potential risk that, when the cable harness is drawn through restricted apertures or passages, in the bodywork, for example, the wrap will remain hanging and tear off, or at least will damage the covering. This is to be avoided.

It is an object of the present invention to provide a wrap which permits the particularly simple, inexpensive, and rapid wrapping of elongate product such that the disadvantages of the prior art do not occur, or at least not to the same extent.

SUMMARY OF THE INVENTION

This object is achieved by a wrap as set out in the main claim. The subclaims relate to advantageous developments of the wrap, to methods of using the wrap, and to a cable assemblies wrapped using the wrap of the invention.

Accordingly, the invention provides a wrap for wrapping an elongate product, such as a cable assembly, with, for example a textile sheath, wherein there is a self-adhesive tape present on at least one edge region of the sheath that is narrow in comparison to the width of the sheath, said tape being adhered on the sheath in such a way that it extends over one of the longitudinal edges of the sheath.

In one first advantageous embodiment of the invention the wrap comprises a second self-adhesive tape on an edge region of the sheath that is narrow in comparison to the width of the sheath, the tape being adhered on the sheath in such a way that it extends over the other of the two longitudinal edges of the sheath.

In a further advantageous embodiment of the invention the two adhesive tapes are disposed on the top face of the sheath.

It is of a further advantage that one adhesive tape is disposed on the top side of the sheath and the other adhesive tape is disposed on the underside of the sheath.

The wrap of the invention is to be used with advantage for wrapping elongate product, such as especially cable harnesses, with a textile sheath, the elongate product being wrapped by the sheath in the axial direction and there being a self-adhesive tape present on at least one edge region of the sheath that is narrow in comparison to the width of the sheath, in the axial direction of the product. The adhesive tape here is adhered on the sheath in such a way that it extends over the longitudinal edge of the sheath. Enveloping of the product with the sheath takes place in such a way that the self-adhesive tape adheres substantially to the sheath itself.

In another advantageous embodiment a single-sidedly self-adhesive tape is present which is adhered on the sheath in such a way that the adhesive is on the inside relative to the center axis of the product.

In a further advantageous embodiment a single-sidedly self-adhesive tape is present which is adhered on the sheath in such a way that the adhesive is on the outside, relative to the center axis of the product.

It has further been found advantageous that the single-sidedly self-adhesive tape is adhered on the first edge region of the sheath in such a way that the adhesive is on the inside relative to the center axis of the product, and that a second self-adhesive tape is adhered on the second edge region of the sheath in such a way that the adhesive is on the outside relative to the center axis of the product, the enveloping of the product taking place in such a way that the two adhesive tapes each adhere to the sheath.

Likewise, unexpectedly for the skilled worker, many advantages arise when the single-sidedly self-adhesive tape is adhered on the first edge region of the sheath in such a way that the adhesive is on the inside relative to the center axis of the product and when a second self-adhesive tape is adhered on the second edge region of the sheath in such a way that the adhesive is on the inside relative to the center axis, of the product, the enveloping of the product taking place in such a way that the first adhesive tape also adheres to the product and the second adhesive tape adheres substantially to the sheath.

The first adhesive tape, which is used for easy fixing of the wrap to the product, may be narrower than the second adhesive tape, which bonds the wrap on the sheath.

Likewise further advantages are found in a form of an enveloping tape, wherein the first adhesive tape is double-sidedly self-adhesive and thus has active bonding areas directed both inward and outward. The second adhesive tape, which may also be a double-sided adhesive tape, is positioned on the second edge region of the sheath in such a way that the adhesive is on the inside relative to the center axis of the product.

The product is enveloped so that one side of the double-sidedly self-adhesive tape permits the enveloping tape to be fixed on the product while the second side of the double-sidedly self-adhesive tape and also the second adhesive tape are available for bonding on the sheath or adhesive on adhesive.

For the embodiment provided with adhesive tape on one side, enveloping of the product may take place in such a way that the adhesive of the adhesive tape is adhered only on the sheath, is adhered to some extent on the sheath and to some extent on the product, or in each case is partly adhered on the sheath and partly initially left open to allow for later fixing, to metal bodywork panels, for example.

For the embodiment equipped on both sides with single-sidedly self-adhesive tape in each case, the product may be enveloped in such a way that the adhesives of the two adhesive tapes each adhere partly on the sheath and partly to themselves adhere only on the sheath.

For the embodiment equipped at both edges with adhesive tape, at least one adhesive tape having a double-sidedly self-adhesive coating, the product may be enveloped in such a way that the adhesives which are not used for bonding directly on the product each adhere only on the sheath each adhere partly on the sheath and partly to themselves.

The embodiment further includes a wrap for wrapping an elongated cable assembly is provided which comprises a textile sheath having a width and a first and a second edge region. A first self-adhesive tape is adhered to the first edge region; the first self-adhesive tape having a width smaller than the width of the sheath; the first self-adhesive tape is adhered to the sheath such that the first self-adhesive tape extends longitudinally along the first edge of the sheath and capable to extend to the second edge region. Further, the width of the first self-adhesive tape is about 10 to 100 mm, and particularly 15 to 50 mm. The textile sheath has a certain length and first self-adhesive tape has a certain length and the textile sheath and the self-adhesive tape include weakened sections about perpendicular to the length for easy tearing off.

Similarly, a method of wrapping an elongated article with a textile sheath is provided, which comprises wrapping the sheath, having a first and a second edge, in axial direction about the article; providing a first self-adhesive tape and adhering the tape to the first edge and the second edge of the sheath along axial direction and tearing off the sheath and the self-adhesive tape at a weakening area provided in the sheath and tape.

The bonding of the adhesive tape or tapes takes place preferably such that there is a 50% overlap of the adhesive tape with the sheath.

As sheath and/or backing material for the adhesive tape it is possible to use all known textile backings such as wovens, knits or nonwoven webs; the term "web" embraces at least textile sheetlike structures in accordance with EN 29092 (1988) and also stitchbonded nonwovens and similar systems. Sheath and backing need not necessarily be of the same materials.

It is likewise possible to use spacer fabrics, including wovens and knits, with lamination. Spacer fabrics of this kind are disclosed in EP 0 071 212 B1. Spacer fabrics are matlike layer structures comprising a cover layer of a fiber or filament fleece, an underlayer and individual retaining fibers or bundles of such fibers between these layers, said fibers being distributed over the area of the layer structure, being needled through the particle layer, and joining the cover layer and the underlayer to one another. As an additional though not mandatory feature, the retaining fibers in accordance with EP 0 071 212 B1 comprise inert mineral particles, such as sand, gravel or the like, for example.

The holding fibers needled through the particle layer hold the cover layer and the underlayer at a distance from one another and are joined to the cover layer and the underlayer.

Spacer wovens or spacer knits are described, inter alia, in two articles, namely an article from the journal *kettenwirk-praxis* 3/93, 1993; pages 59 to 63, "Raschelgewirkte Abstandsgewirke" [Raschel-knitted spacer knits]

and an article from the journal *kettenrwirk-praxis* 1/94, 1994, pages 73 to 76, "Raschelgewirkte Abstandsgewirke", the content of said articles being included here by reference and being part of this disclosure and invention.

Suitable nonwovens include, in particular, consolidated staple fiber webs, but also filament webs, meltblown webs, and spunbonded webs, which generally require additional consolidation. Known consolidation methods for webs are mechanical, thermal, and chemical consolidation. Whereas with mechanical consolidations the fibers are mostly held together purely mechanically by entanglement of the individual fibers, by the interlooping of fiber bundles or by the stitching-in of additional threads, it is possible by thermal and by chemical techniques to obtain adhesive (with binder) or cohesive (binderless) fiber-fiber bonds. Given appropriate formulation and an appropriate process regime, these bonds may be restricted exclusively, or at least predominantly, to the fiber nodal points, so that a stable, three-dimensional network is formed while retaining the loose open structure in the web.

Webs which have proven particularly advantageous are those consolidated in particular by overstitching with separate threads or by interlooping.

Consolidated webs of this kind are produced, for example, on stitchbonding machines of the "Malifleece" type from the company Karl Meyer, formerly Malimo, and can be obtained, inter alia, from the companies Naue Fasertechnik and Techtex GmbH. A Malifleece is characterized in that a cross-laid web is consolidated by the formation of loops from fibers of the web.

The backing used may also be a web of the Kunit or Multiknit type. A Kunit web is characterized in that it originates from the processing of a longitudinally oriented fiber web to form a sheetlike structure which has the heads and legs of loops on one side and, on the other, loop feet or pile fiber folds, but possesses neither threads nor prefabricated sheetlike structures. A web of this kind has been produced, inter alia, for many years, for example on stitchbonding machines of the "Kunitvlies" type from the company Karl Mayer. A further characterizing feature of this web is that, as a longitudinal-fiber web, it is able to absorb high tensile forces in the longitudinal direction. The characteristic feature of a Multiknit web relative to the Kunit is that the web is consolidated on both the top and bottom sides by virtue of the double-sided needle punching.

Finally, stitchbonded webs are also suitable as an intermediate forming a sheath and an adhesive tape of the invention. A stitchbonded web is formed from a nonwoven material having a large number of stitches extending parallel to one another. These stitches are brought about by the incorporation, by stitching or knitting, of continuous textile threads. For this type of web, stitchbonding machines of the "Maliwatt" type from the company Karl Mayer, formerly Malimo, are known.

Also particularly advantageous is a staple fiber web which is mechanically preconsolidated in the first step or is a wet-laid web laid hydrodynamically, in which between 2% and 50% of the web fibers are fusible fibers, in particular between 5% and 40% of the fibers of the web.

A web of this kind is characterized in that the fibers are laid wet or, for example, a staple fiber web is preconsolidated by the formation of loops from fibers of the web or by needling, stitching or air-jet or water-jet treatment.

In a second step, thermofixing takes place, with the strength of the web being increased again by the (partial) melting of the fusible fibers.

For the inventive use of nonwovens, the adhesive consolidator of mechanically preconsolidated or wet-laid webs is of particular interest, it being possible for said consolidation to take place by way of the addition of binder in solid, liquid, foamed or pastelike form. A great diversity of theoretical embodiments is possible for example, solid binders as powders for trickling in; as a sheet or as a mesh, or in the form of binding fibers. Liquid binders may be applied as solutions in water or organic solvent or as a dispersion. For adhesive consolidation, binder dispersions are predominantly chosen: thermosets in the form of phenolic or melamine resin dispersions, elastomers as dispersions of natural or synthetic rubbers, or usually, dispersions of thermoplastics such as acrylates, vinyl acetates, polyurethanes, styrene-butadiene systems, PVC, and the like, and also copolymers thereof. Normally, the dispersions are anionically or nonionically stabilized, although in certain cases cationic dispersions may also be of advantage.

The binder may be applied in a manner which is in accordance with the prior art and for which it is possible to consult, for example, standard works of coating or of nonwoven technology such as "Vliesstoffe" (Georg Thieme Verlag, Stuttgart, 1982) or "Textiltechnik-Vliesstofferzeugung" (Arbeitgeberkreis Gesamttextil Eschborn, 1996).

For mechanically preconsolidated webs which already possess sufficient composite strength, the single-sided spray application of a binder is appropriate for effecting specific changes in the surface properties.

Such a procedure is not only sparing in its use of binder but also greatly reduces the energy requirement for drying. Since no squeeze rolls are required and the dispersion remains predominantly in the upper region of the web material, unwanted hardening and stiffening of the web can very largely be avoided.

For sufficient adhesive consolidation of the web backing, the addition of binder in the order of magnitude of from 1% to 50%, in particular from 3% to 20%, based on the weight of fiber web, is generally required.

The binder may be added as early as during the manufacture of the web, in the course of mechanical preconsolidation, or else in a separate process step, which may be carried out in-line or off-line. Following the addition of the binder it is necessary temporarily to generate a condition in which the binder becomes adhesive and adhesively connects the fibers—this may be achieved during the drying, for example, of dispersions, or else by heating, with further possibilities for variation existing by way of areal or partial application of pressure. The binder may be activated in known drying tunnels, or else, given an appropriate selection of binder, by means of infrared radiation, UV radiation, ultrasound, high-frequency radiation or the like. For the subsequent end use it is sensible, although not absolutely necessary, for the binder to have lost its tack following the end of the web production process. It is advantageous that, as a result of the thermal treatment, volatile components such as fiber assistants are removed, giving a web having favorable fogging values so that when a low-fogging adhesive is used it is possible to produce an adhesive tape having particularly advantageous fogging values, so that the sheath as well exhibits a very low fogging value.

A further, special form of adhesive consolidation consists in activating the binder by incipient dissolution or swelling. In this case it is also possible in principle for the fibers themselves, or admixed special fibers, to take over the function of the binder. Since, however, such solvents are objectionable on environmental grounds, and/or are problematic in their handling, for the majority of polymeric fibers, this process is not often employed.

Starting materials envisaged for the textile backing include, in particular, polyester, polypropylene, viscose or cotton fibers. The present invention is, however, not restricted to said materials; rather it is possible to use a large number of other fibers to produce the web, this being evident to the skilled worker without any need for inventive activity.

A sheath made of paper, of a laminate, of a film (for example, PP, PE, PET, PA, PU), of foam, or of a foamed film is also suitable for wrapping the elongate product.

Said materials may also be used with advantage as backing material for the adhesive tape.

These nontextile sheetlike materials are particularly appropriate when specific requirements necessitate such a modification of the invention. Films are generally thinner in comparison to textiles, for example, and as a result of the closed layer offer additional protection against penetration of chemicals and service fluids such as oil, gasoline, antifreeze, and the like into the actual cable area, and can be substantially adapted to requirements by an appropriate selection of the material from which they are constructed: with polyurethanes and polyolefin copolymers, for example, flexible and elastic wraps can be produced; with polyester and polyamides, good abrasion resistance and temperature resistance are achieved.

Foams or foamed films, on the other hand, possess the qualities of more substantial space filling arid of good soundproofing—where a length of cable is laid, for example, in a ductlike or tunnellike area in the vehicle, a wrapping tape of appropriate thickness and soundproofing can prevent disruptive flapping and vibration from the outset.

The invention finally embraces an elongate product, especially a cable harness, wrapped with a wrap of the invention, the elongate product being enveloped by the sheath in the axial direction and there being a self-adhesive tape present on at least one edge region of the sheath that is narrow in comparison to the width of the sheath, in the axial direction of the product, the adhesive tape being adhered to the sheath in such a way that it extends over the longitudinal edge of the sheath. The product is enveloped with the sheath in such a way that thee self-adhesive tape adheres substantially on the sheath itself.

For use in connection with cable harnesses which, are used in automobile construction, particularly advantageous widths for the sheath are 80, 105, and 135 mm, although the sheath may also be produced in variable widths depending on the particular application; the length is guided by the design of the cable harness.

The overall product of the invention, comprising adhesive tape and sheath, i.e., all embodiments of the wrap, may be provided in fixed lengths, such as by the meter, for example, or else as a continuous product on rolls (Archimedian spirals). For use, then, in the latter case it is possible to separate off variable lengths by means of knives, shears or dispensers or the like or else, given an appropriate choice of the materials for both the sheath and the adhesive tapes, to carry out manual processing without tools. For bonding, use is made in particular of strips of the adhesive tape having a width of from 15 to 50 mm.

In order to produce one particularly advantageous wrap, a first roll of adhesive tape is unrolled mechanically and the adhesive tape is supplied to the roll with the uncoated textile wrapper. This second roll rotates in such a way that the speed of the adhesive tape and of the wrapper to be unrolled are identical. The adhesive tape is placed on one edge of the wrapper in such a way that the adhesive tape bonds on the wrapper to an extent of preferably 50%, while the remaining 50% of the adhesive of the adhesive tape extends freely beyond said edge.

The wrapper ensheathed with the first adhesive tape runs over a deflecting roller.

Where necessary, a second roll of adhesive tape is unrolled at the same time and supplied to the deflecting roller. The second adhesive tape is placed on the other, free edge of the wrapper, again so that the overlap of adhesive tape with wrapper is preferably 50%.

As a result of the deflecting roller, the two adhesive compositions are offset from one another by 180°.

This production of the composite product can be carried out either by the end user on site themselves, by way of appropriate dispensers, or else the product can be supplied as a prefabricated total system, in the form of rolls.

The inventive wrapping of the preferred cable harness providers it with outstanding protection and vibration damping. The textile sheath is lightweight, and so very little weight is added to the cable harness, especially in comparison with the conventional methods of wrapping; namely the spiral winding of an adhesive tape around the bundled cables, and extensible, so that the cable harness as a whole can be shaped. In difficult situations, accordingly, it can be adapted outstandingly to the available space conditions.

As a result of its originally circular or oval cross section, the cable harness of the invention makes it easier to pass the cables without disruption through bores, holes, apertures, and the like, and then allows it to be readily deformed into other geometries and cross sections, so that it can be adapted ideally to the local circumstances. Thus it is even possible to obtain a virtually flat profile when laying cables under the carpet, in the floor assembly, for example, without having to incorporate the different cross sections during actual manufacture of the cable harness.

As compared with conventional spiral winding, longitudinal envelopment of this kind is not only simpler and quicker to operate but also saves on adhesive, as a result of the fact that adhesive tapes are used only in the marginal region.

In addition to the cost savings, there is also a reduction in fogging by the amount of adhesive saved; similarly, problems in compatibility between adhesive and cable wrap, such as may occur particularly with PVC-free cables and adhesives that are not specially suitable, are reduced on account of the fact that, in the case of the longitudinal wrapping of the invention, there is little area of contact, if any, between adhesive and cable insulation.

It proves further advantageous that in the region of the start of the bond up to three plies of backing may lie one above the other; where particularly stringent requirements are imposed on the damping properties or the abrasion resistance, and are limited to subregions of the cross section, the point of overlap can be positioned in accordance with the requirements; the area of multiple plies can easily be controlled by the selection of the width of the adhesive tape and also by the bonding technique.

Finally, the inventive mode of wrapping prevents creases forming.

When using embodiments having self-adhesive regions which are used directly on the product for the purpose of fixing, a further effect achieved in addition to the simplification of the wrapping operation itself is that the hoselike covering on the product, usually cable harnesses consisting of various individual cables, is secured against slippage, shifting, and the like in the course of production, transit, and assembly and later during long-term use.

The inventive solution also has the advantages that the cable harness in question is a clean, pennant-free cable harness which affords good surface protection, high bundling power, and good soundproofing and, in the case of thick cable harnesses, very high deformability in the cross-sectional direction.

BRIEF DESCRIPTION OF THE DRAWINGS

The invention is illustrated below with reference to a number of figures, without thereby wishing to subject the invention to any unnecessary restriction.

In the figures.

DETAILED DESCRIPTION OF THE PRESENTLY PREFERRED EMBODIMENTS

Figure 1:
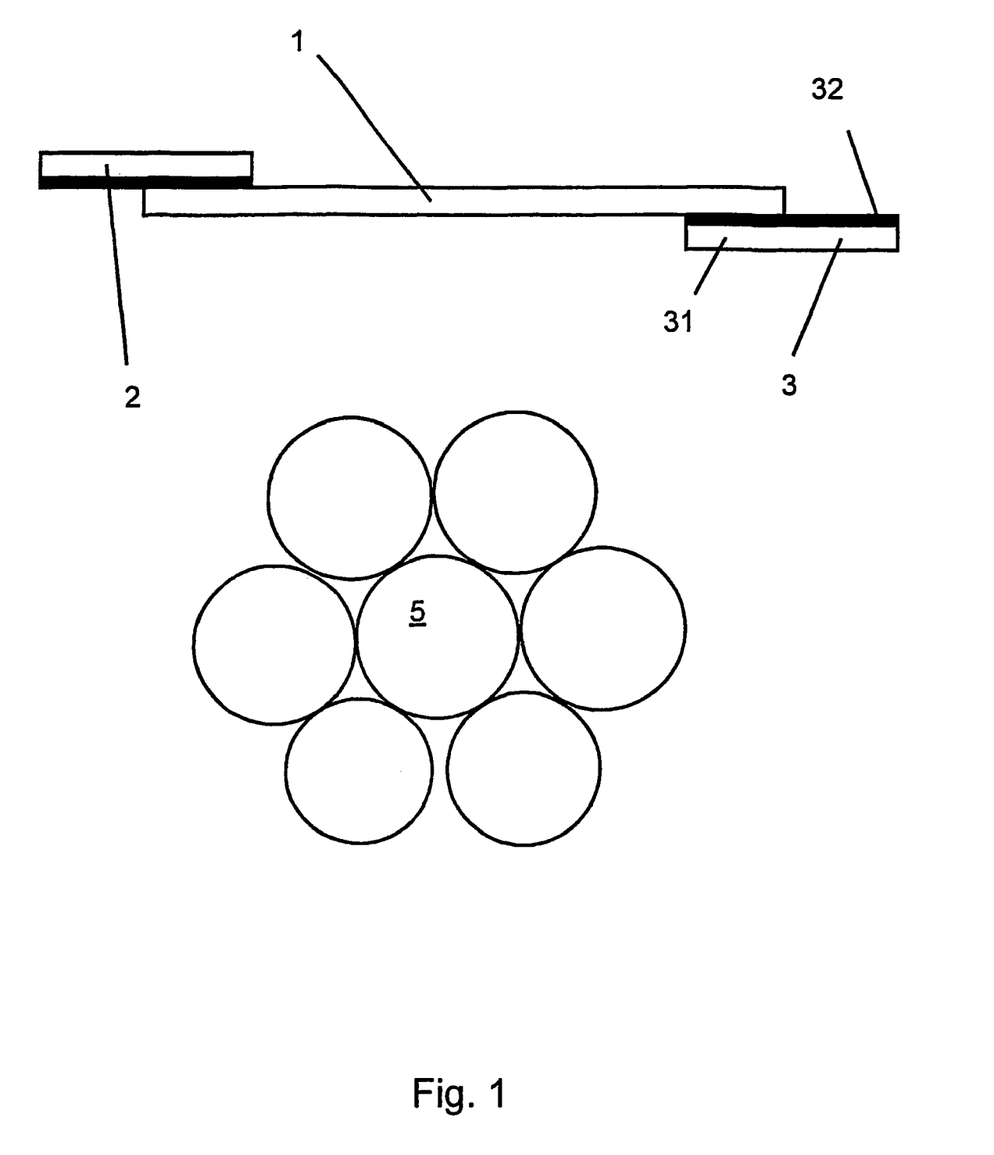
FIG. 1 shows a wrap of the invention, composed of a sheath equipped with two adhesive tape sections.

FIG. 1 shows in cross section a wrap with a textile sheath 1 which can be used to wrap the elongate product, especially cable harnesses.

A single-sidedly self-adhesive tape 2 is adhered in the axial direction of the product to at least one edge region of the sheath 1, said edge region being narrow in comparison to the width of the sheath 1, in such a way that the adhesive is on the inside relative to the center axis of the product to be wrapped (cable harness 5). Adhered on the second edge region of the sheath 1 is a second self-adhesive tape 3, adhered in such a way that the adhesive 32 is on the outside relative to the center axis of the product. The adhesive tape 3 is composed substantially of the preferably textile backing 31 and the adhesive 32.

Figure 2:
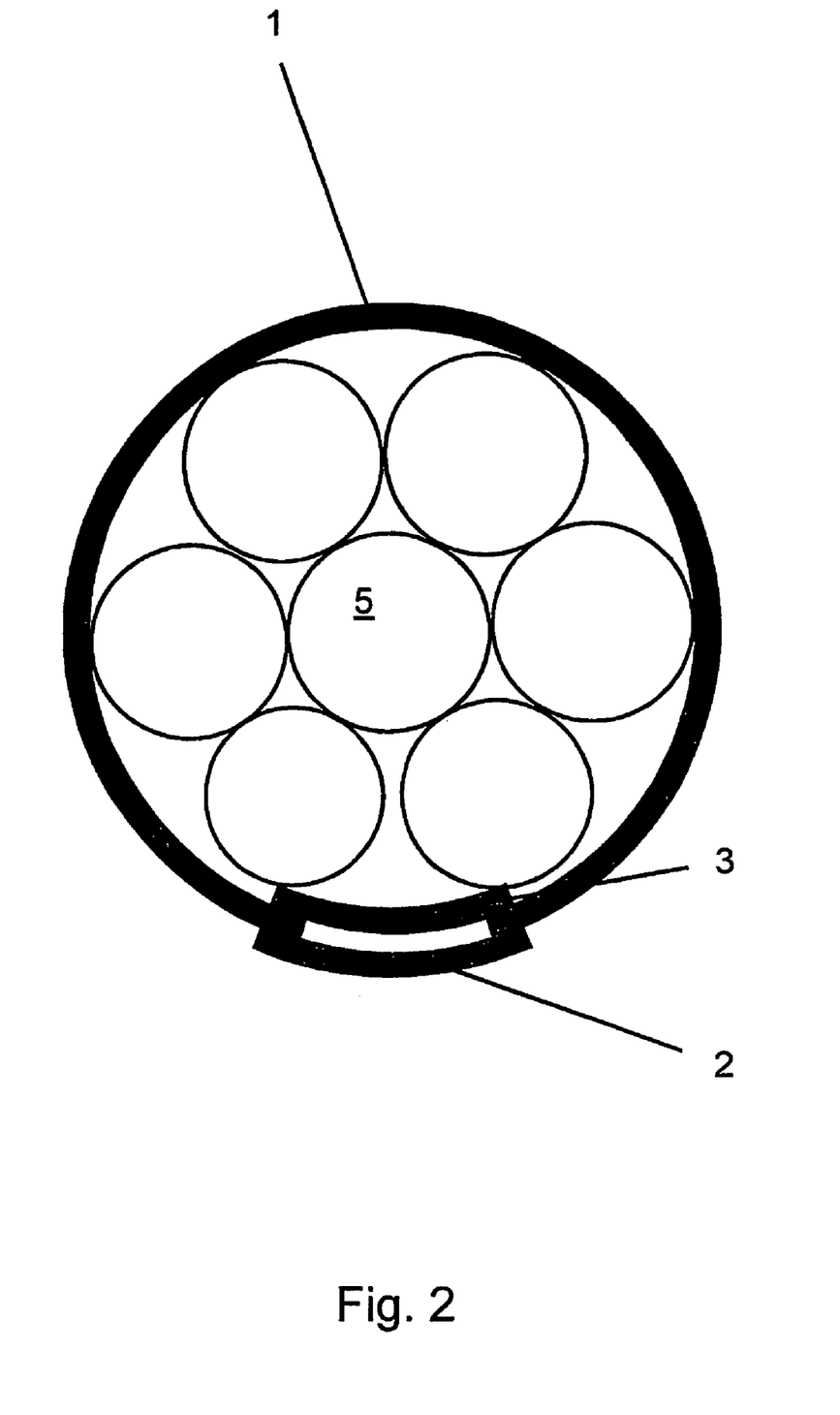
FIG. 2 shows a cable harness wrapped in accordance with the invention.

FIG. 2 shows an enveloped cable harness 5 composed of individual cables, in this case seven. The cable harness 5 is wrapped in such a way that the adhesives 32 of the two adhesive tapes 2, 3 each adhere to the sheath 1 and to some extent to themselves; in the case depicted, the bonding of the adhesive tape on the sheath is less than 50%.

Figure 3:
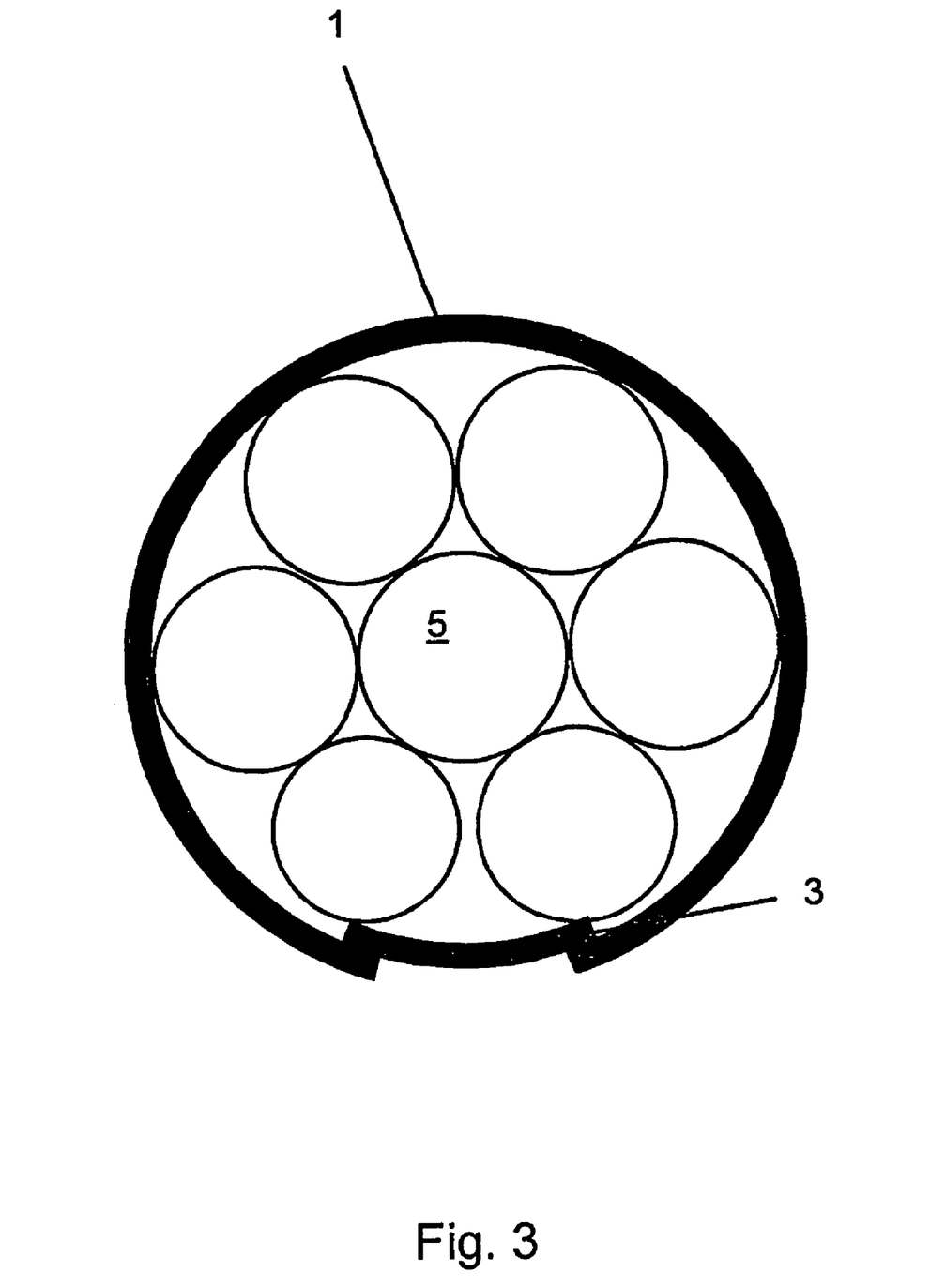
FIG. 3 shows a sheath equipped with an adhesive tape section, with the adhesive facing outward.

By omitting the adhesive 2, as shown in FIG. 3, a further embodiment which exists as a result of an outwardly oriented adhesive strip is the possibility of fixing the longitudinally wrapped cable harness to surrounding surfaces—to metal bodywork panels, for example—in order thus to prevent slippage, flapping or the like.

Figure 4:
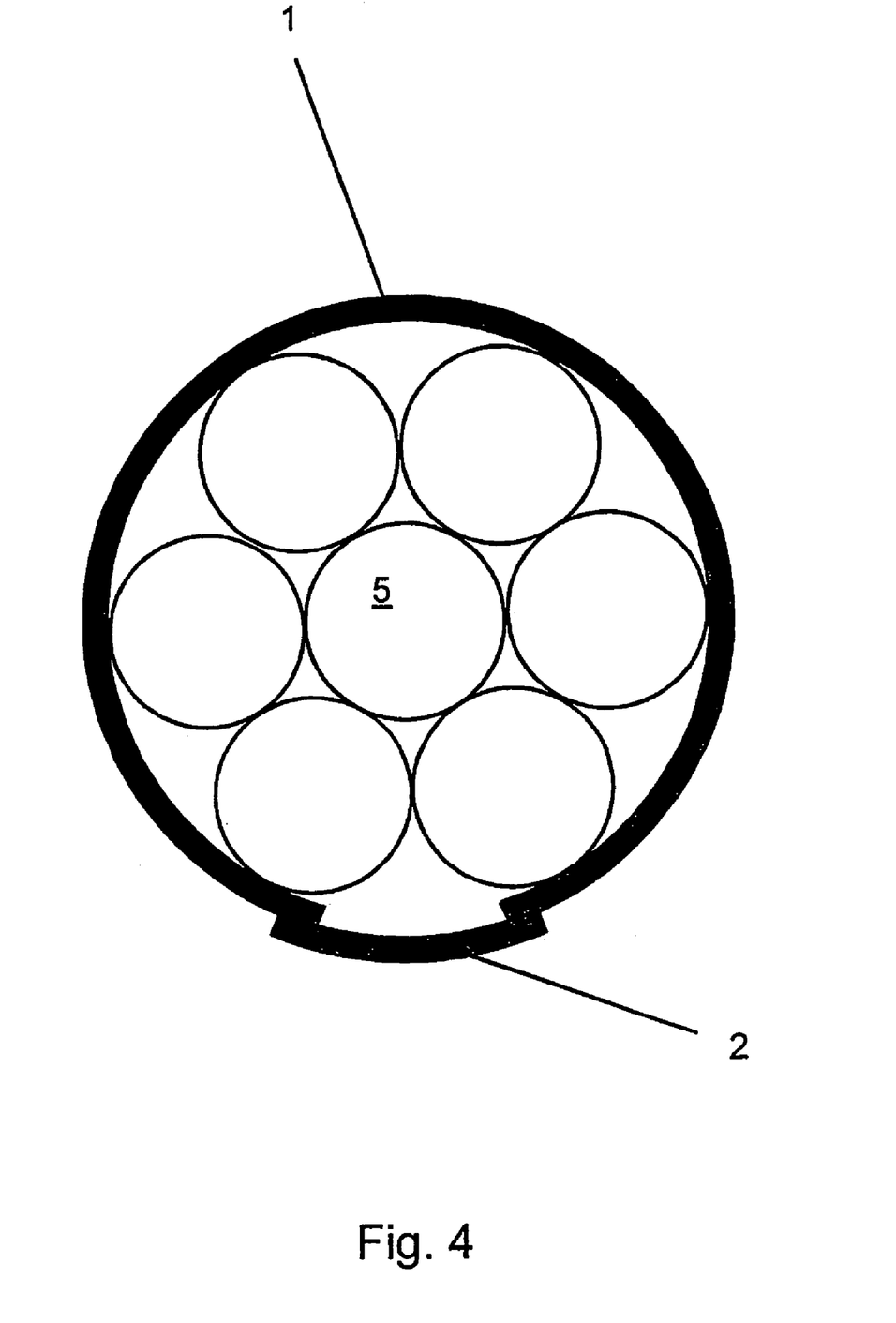
FIG. 4 shows a sheath equipped with an adhesive tape section, with the adhesive facing inward.

In another special embodiment it is possible by omitting the adhesive tape 3 (see FIG. 4)—i.e., only one edge of the sheath is provided with an adhesive tape—to retain a narrow adhesive region of the adhesive tape, pointing inwardly to the cable harness, which sticks to one or more individual cables of the cable harness and thus fixes the configuration. Slippage of the wrap is therefore largely prevented.

Figure 5:
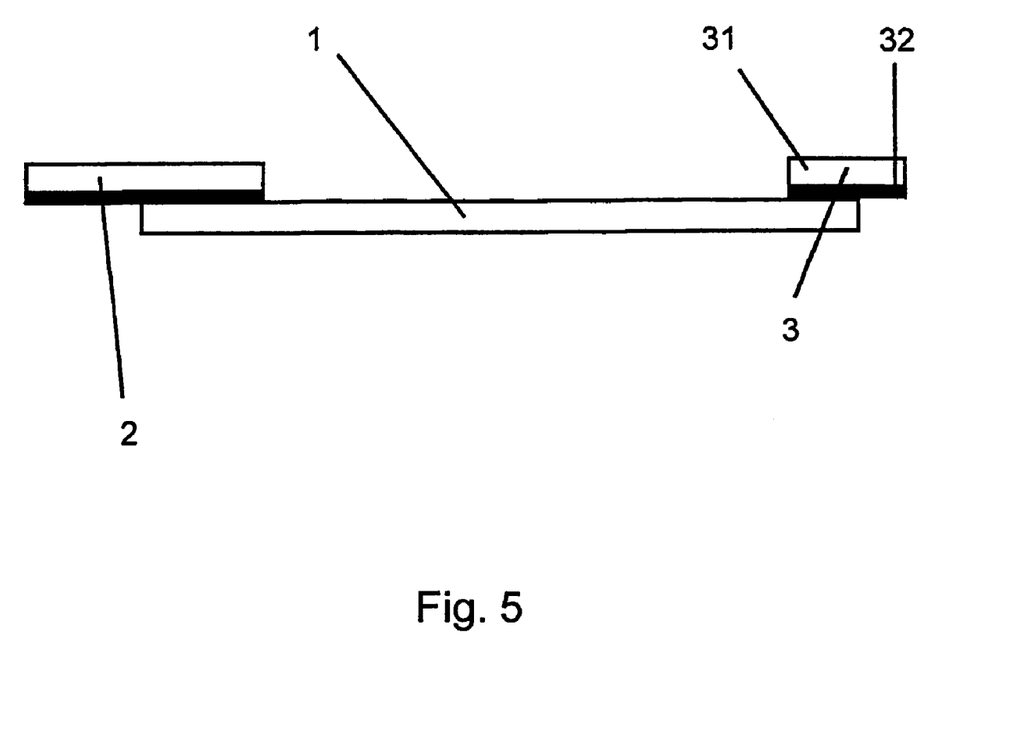
FIG. 5 shows a second wrap of the invention, composed of a sheath equipped with two adhesive tape sections.

FIG. 5 shows in cross section a second wrap with a textile sheath 1 which can be used to wrap elongate product, especially cable harnesses.

A single-sidedly self-adhesive tape 2 is adhered in the axial direction of the product to at least one edge region of the sheath 1, said edge region being narrow in comparison to the width of the sheath 1, in such a way that the adhesive is on the inside relative to the center axis of the product to be wrapped (cable harness 5). Adhered on the second edge region of the sheath 1 is a second self-adhesive tape 3, adhered in such a way that the adhesive 32 is likewise on the inside relative to the center axis of the product.

Figure 6:
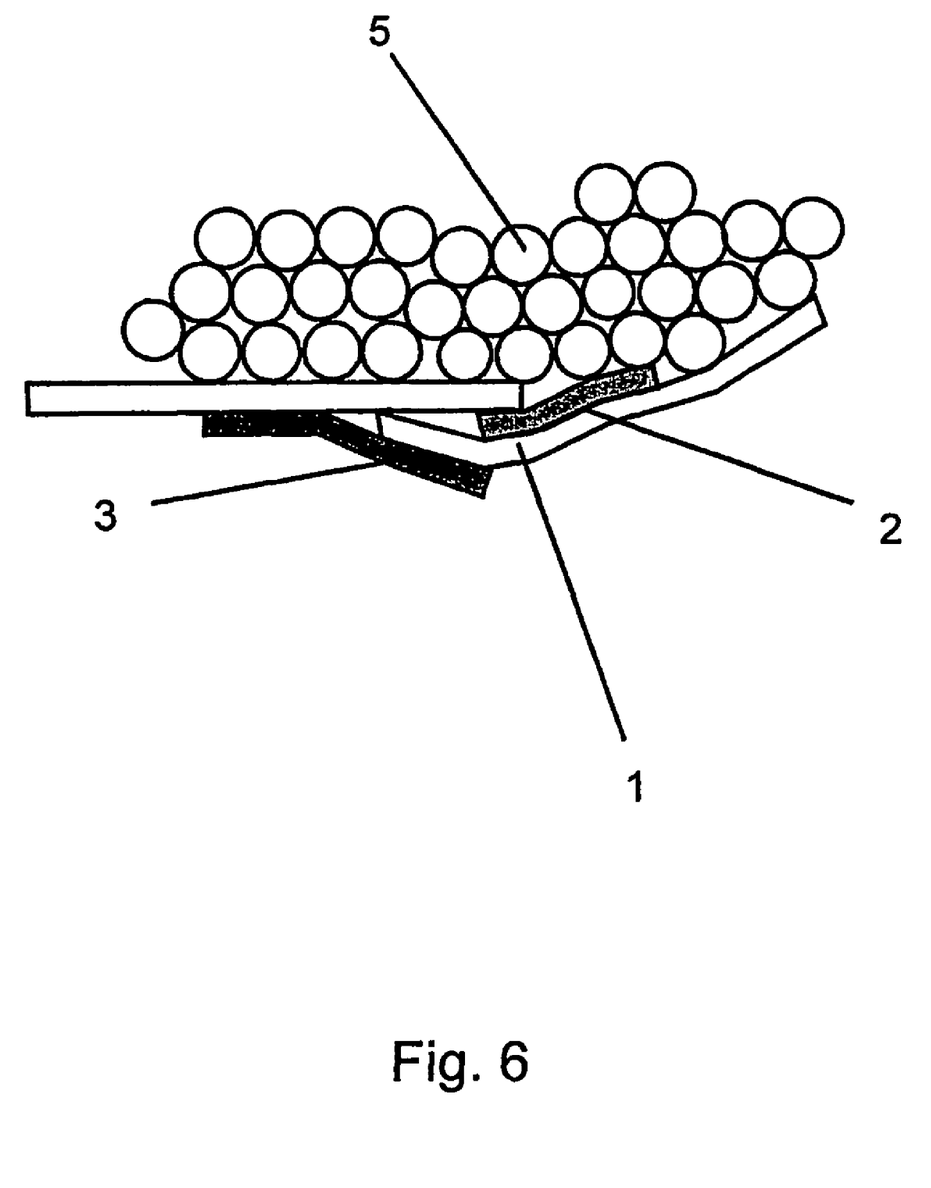
FIG. 6 shows the product wrapped with the wrap of the invention from FIG. 5.

FIG. 6 shows the product 5 wrapped with wrapping of the invention from FIG. 5, especially the region which fixes the envelope in its position.

During the wrapping procedure, the first adhesive tape 2 serves to affix the sheath 1 or the entire wrap easily on the product 5 so that the wrap does not slip. The first adhesive tape 2 is narrower than the second adhesive tape 3 which fixes the sheath 1 and thus the entire wrap around the product 5.

Figure 7:
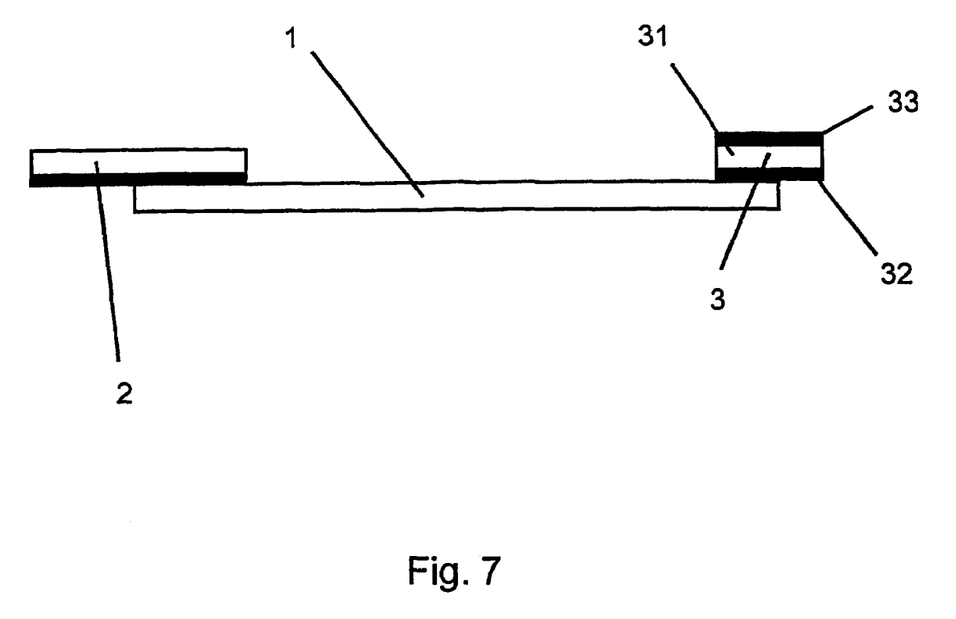
FIG. 7 shows a further wrap of the invention, composed of a sheath equipped with two adhesive tape sections, one adhesive tape section being double-sidedly adhesive.

FIG. 7 shows in cross section a further wrap with a textile sheath 1 which can be used to wrap elongate product, especially cable harnesses.

The wrap corresponds essentially to that of FIG. 5, except that on the second edge region of the sheath 1 there is, a second self-adhesive tape 3, which is double-sided, i.e., has two coatings of adhesive, 32 and 33.

Otherwise the adhesive tape 3 is composed essentially of the preferably textile backing 31.

The invention claimed is:

1. A wrap for wrapping an elongated cable assembly, comprising
    a textile sheath having a width and a length and a first and a second edge region extending along the entire length;
    a first self-adhesive tape is adhered to the first edge region;
    the first self-adhesive tape having a width smaller than the width of the sheath;
    wherein the first self-adhesive tape is adhered to the sheath such that the first self-adhesive tape extends longitudinally along the first edge extending along the entire length of the sheath and capable to extend to the second edge region,
    a second self-adhesive tape adhered to the second edge region;
    the second self-adhesive tape being narrower than the width of the sheath;
    wherein the second self-adhesive tape is adhered to the sheath such that the second self-adhesive tape extends longitudinally along the second edge of the sheath and capable to extend to the first edge region, and
    wherein the first tape has a length and wherein the sheath and the first tape each include weakened sections perpendicular to the respective length for easy tearing off.

2. An elongated cable assembly wrapped with a textile sheath having a width and a length, and self-adhesive tape, the textile sheath includes a first and a second edge, wherein the sheath extends in axial direction along the length of the cable assembly, wherein the sheath comprises a first and a second edge and wherein the self-adhesive tape is disposed along the length and adheres to the first and the second edge, and the adhesive tape is narrower than the width of the sheath, the adhesive tape being adhered to the sheath in such a way that the tape extends longitudinally along the sheath, and the self-adhesive tape adheres substantially to the sheath.

* * * * *